United States Patent [19]
Hudspeth et al.

[11] Patent Number: 6,006,410
[45] Date of Patent: Dec. 28, 1999

[54] APPARATUS FOR REMOVING SCREWS OR RIVETS FROM EYEGLASSES

[75] Inventors: James M. Hudspeth, Oceanside, Calif.; Joshua Freilich, Santa Fe, N.Mex.

[73] Assignee: Western Optical Supply, Inc., Santa Fe, N.Mex.

[21] Appl. No.: 09/235,617

[22] Filed: Jan. 21, 1999

[51] Int. Cl.$^6$ ................................................. B23P 19/02
[52] U.S. Cl. ........................................................ 29/251
[58] Field of Search .............................. 29/251; 81/3.5, 81/3.6

[56] References Cited

U.S. PATENT DOCUMENTS 2,360,111   10/1944   Dedona ........................... 81/3.6

*Primary Examiner*—Timothy V. Eley
*Assistant Examiner*—Benjamin M. Halpern

[57] ABSTRACT

An apparatus for removing broken connecting mechanisms imbedded in eyeglass frames has a platform to transversely hold the eyeglass frame secure and proximal to the broken connecting mechanism, a means for transversely moving a pin coaxially with the broken connecting mechanism, and a means for receiving the pin and broken connecting mechanism.

An embodiment has a cylinder, a piston to fit in the cylinder, a lever to communicate with the piston, a post or die to communicate with the piston, a post or die to communicate with the embodiment, a handle that communicates with the lever, a handle that communicates with the embodiment, whereby the lever and the handle provide for lowering the force required.

4 Claims, 1 Drawing Sheet

APPARATUS FOR REMOVING SCREWS OR RIVETS FROM EYEGLASSES

BACKGROUND OF THE INVENTION

This invention relates generally to the field of eyeglasses, and more particularly to an apparatus for removing screws or rivets from eyeglasses.

Eyeglass frames have small screws or rivets that allow the temples to fold and allow the lens portion of the frame to open to install or replace a lens. These screws or rivets are 1.25 to 1.75 millimeters in diameter. The screws will become stripped when they have been tightened too much or just worked too much. When this occurs the only way to replace the stripped screw is to drill it out or try to punch it out using a hammer and a very small punch. The heads of the screws or rivets are of different diameters and the portion around the head of the screw or rivet has to be supported or the removal process will damage the eyeglass frame beyond repair.

Eyeglass frames are expensive and so replacing stripped screws or damaged rivets is important from the consumer's viewpoint and a fast removal with out damage to the frame is important from the Optician's viewpoint. When the screw is drilled or punched out by hand the frames are often damaged beyond repair resulting in replacing the frame. Drilling the screws or rivets out results in damaged frames since the frame cannot be held in a vise without damaging the frame.

SUMMARY OF THE INVENTION

The primary object of the invention is to provide an apparatus and method for removing damaged screws or rivets from eyeglasses.

A related object of the present invention is to remove the screw quickly and without damaging the frame.

Another object of the invention is to provide an efficient, practical hand-held apparatus of simple construction that will remove damaged screws or rivets from eyeglasses.

Another object of the invention is to provide an efficient, practical hand-held apparatus of simple construction, which can be operated by a person with a minimum of effort.

A further object of the invention is to provide an efficient, practical hand-held apparatus of simple construction, which will have a removable post and a removable die.

Another object of the invention is provide a powerful hand held tool for removing screws or rivets from eyeglass frames that is easily manufactured with a variety of sizes and shapes of posts and dies.

Another object of the invention is provide a powerful tool that can be operated by persons of small stature and small hands who need to remove screws or rivets from eyeglass frames.

In accordance with a preferred embodiment of the invention, an apparatus for removing broken connecting mechanisms imbedded in eyeglass frames comprises a platform to transversely hold the eyeglass frame secure and proximal to the broken connecting mechanism, a means for transversely moving a pin coaxially with the broken connecting mechanism; and a means for receiving the pin and broken connecting mechanism.

The purpose of the present invention is to provide an apparatus for easily removing damaged or stripped screws or damaged rivets or with a hand held apparatus for removing screws or rivets from eyeglasses comprising: an embodiment having a cylinder, a piston to fit in said cylinder, a lever to communicate with said piston, a post or die to communicate with said piston, a post or die to communicate with said embodiment, a handle that communicates with said lever, and a handle that communicates with said embodiment.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include an exemplary embodiment of the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
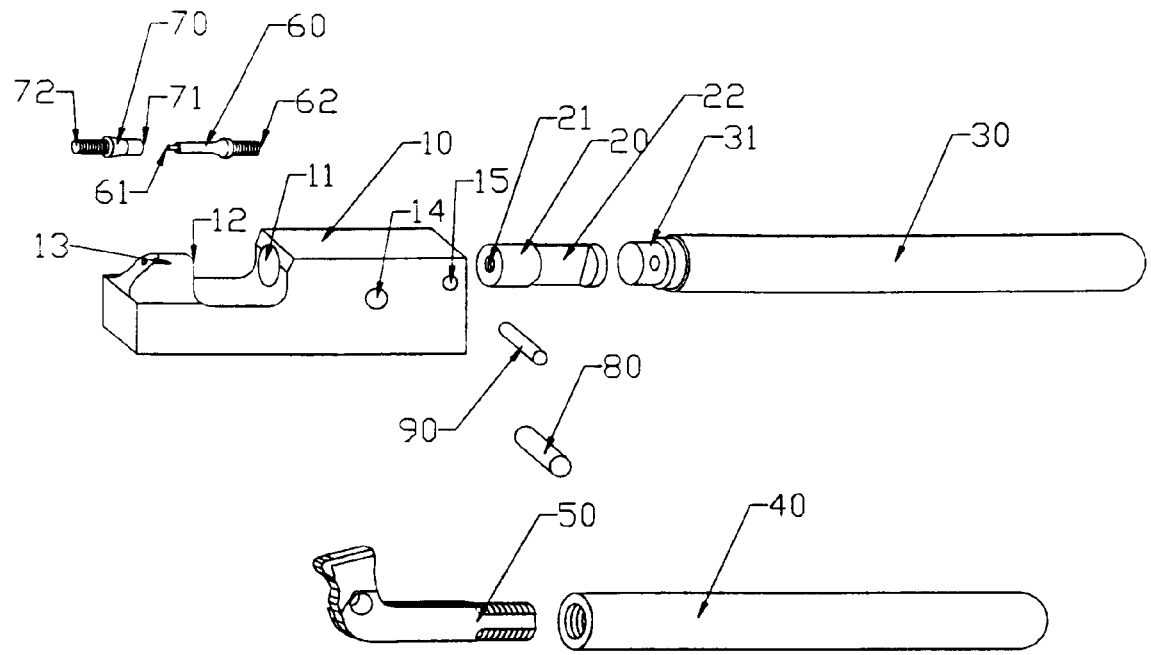
FIG. 1 is an exploded view of an apparatus for removing screws or rivets from eyeglasses.
Figure 2:
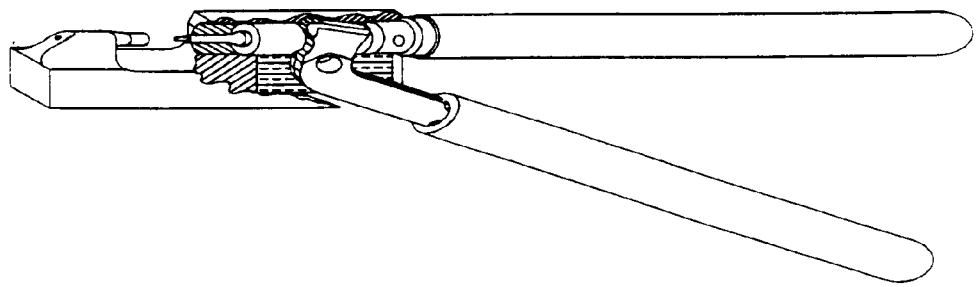
FIG. 2 is a cutaway view of an apparatus for removing screws or rivets from eyeglasses.

FIG. 1 is an exploded view of an apparatus for removing screws or rivets from eyeglasses. FIG. 2 is a cutaway view of an apparatus for removing screws or rivets from eyeglasses.

Eyeglass frames use screws or rivets or other connecting mechanisms to hold the temple hinge to the eye wire hinge. Screws or rivets are also used to keep the eye wire closed so that the lens can not fall out. These are small screws or rivets typically 0.150 inches long and 0.050 inches in diameter. The screw is usually a slotted screw that a regular Optician's screwdriver will remove from the hinge or eye wire. When the hinge starts to wear the screw will be tightened and if the screw head is damaged the screw can not be removed by normal methods.

Upon inspection of FIG. 1 it will be seen that the pin or post 60 and the die 70 are used to push the stripped or damaged screw or other connecting mechanism from its engagement with the threads in the hinge or the eye-wire of the eyeglass frame transversely along the direction of the screw. The post end 61 is of a smaller diameter then the eyeglass screw thread pitch diameter and when the post end 61 enters the hinge or eye-wire screw threads the screw is forced into the die aperture 71 which is pressed against the opposite side of the hinge or eye-wire thus removing the screw from its placement. The die aperture 71 is of the means and function to fit many different size screw heads. The post end 62 is of a means to be held into the aperture 21 of the piston 20 or the aperture 12 of the embodiment 10. The die end 72 is of a means to be held into the aperture 12 of the embodiment 10 or the aperture 21 of the piston 20. The eyeglass frame is held in embodiment 10 between aperture 12 and cylinder 11. Aperture 12 and cylinder 11 create a platform to hold eyeglass frame transversely secure and in the proximity of the broken screw to be removed.

Having observed the details of the post 60 and the die 70 attention may now be given to the preferred embodiment 10 and the piston 20. The projection 13 of the preferred embodiment 10 is shaped to provide means and function to position the embodiment to maximize the number of different style frames that the apparatus may be used with. The aperture 14 of the preferred embodiment 10 is of a means to accept pivot pin 80. The aperture 15 of the preferred embodiment 10 is of a means to accept pin 90. The cylinder 11 is of a means to accept the piston 20, which upon transversely moving the pin coaxially in the direction of the broken connecting mechanism, can receive the pin and broken connecting mechanism.

The slot 22 in the piston 20 is perpendicular to the axis of piston 20 and communicates with lever 50. The handle 40 communicates with the lever 50. The handle 30 provides the means and function to communicate with the embodiment 10. The handle 40 communicating with the lever 50 provides the leverage lowering the force required to remove the screws or rivets.

In the preferred embodiment 10, the hand held apparatus is placed in a manner to align the post 60 and die 70 axially with the centerline of the screw that has to be removed. The handle 40 and the handle 41 are then closed and the screw or rivet will be forced from is placement.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for removing broken connecting mechanisms imbedded in eyeglass frames comprising:

a platform to transversely hold the eyeglass frame secure and proximal to the broken connecting mechanism;

a means for transversely moving a pin coaxially with the broken connecting mechanism; and a means for receiving the pin and broken connecting mechanism.

2. An apparatus for removing broken connecting mechanisms imbedded in eyeglass frames as claimed in claim 1 wherein the means for moving the pin includes a piston fit into a cylinder, and a lever in communication with the piston.

3. An apparatus for removing broken connecting mechanisms imbedded in eyeglass frames as claimed in claim 2 wherein the means for moving the pin further includes a post, lever, and handle arrangement to apply force coaxially with the broken connecting mechanism.

4. An apparatus for removing broken connecting mechanisms imbedded in eyeglass frames as claimed in claim 1 wherein the means for receiving the pin and broken connecting mechanism can accommodate many sizes to allow for connecting mechanism of different sizes.

* * * * *